United States Patent
Johansson et al.

(10) Patent No.: US 11,039,338 B2
(45) Date of Patent: Jun. 15, 2021

(54) METHODS, SYSTEMS, AND COMPUTER READABLE MEDIA FOR CONTROL PLANE TRAFFIC FILTERING IN A CONTROL AND USER PLANE SEPARATION (CUPS) ENVIRONMENT

(71) Applicant: Keysight Technologies, Inc., Santa Rosa, CA (US)

(72) Inventors: Stefan Jan Johansson, Round Rock, TX (US); Robin Lee O'Connor, Austin, TX (US); Fred Strelzoff, Pflugerville, TX (US); Shardendu Pandey, Cedar Park, TX (US); Salomon Noubieli Tatang, Boulogne-Billancourt (FR); Jason Chia-Suan Wang, Annecy (FR)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/538,585

(22) Filed: Aug. 12, 2019

(65) Prior Publication Data
US 2021/0051517 A1 Feb. 18, 2021

(51) Int. Cl.
*H04W 28/06* (2009.01)
*H04W 28/02* (2009.01)
*H04W 76/12* (2018.01)
*H04W 8/08* (2009.01)
*H04W 68/00* (2009.01)

(52) U.S. Cl.
CPC ............. *H04W 28/06* (2013.01); *H04W 8/08* (2013.01); *H04W 28/0226* (2013.01); *H04W 68/005* (2013.01); *H04W 76/12* (2018.02)

(58) Field of Classification Search
CPC ......... H04W 4/029; H04W 8/12; H04W 8/10; H04W 8/26
See application file for complete search history.

(56) References Cited

U.S. PATENT DOCUMENTS

| | | |
|---|---|---|
| 7,865,944 B1 | 1/2011 | Shu et al. |
| 8,018,955 B2 | 9/2011 | Agarwal et al. |
| 8,583,109 B2 | 11/2013 | Gillot et al. |
| 10,057,126 B2 | 8/2018 | Vedam et al. |
| 10,243,862 B2 | 3/2019 | Cafarelli et al. |
| 10,278,087 B2 | 4/2019 | Tenea et al. |
| 2009/0129271 A1 | 5/2009 | Ramankutty et al. |

(Continued)

OTHER PUBLICATIONS

Notice of Allowance and Fee(s) Due for U.S. Appl. No. 15/721,073 (dated Dec. 12, 2018).

(Continued)

*Primary Examiner* — Gregory B Sefcheck
*Assistant Examiner* — Debebe A Asefa

(57) ABSTRACT

According to one method for control plane traffic filtering in a control and user plane separation (CUPS) environment, the method occurs at a network node implemented using at least one processor and at least one memory. The method includes receiving, from one or more sources, network location information associated with a first network location; receiving control plane messages for different network locations; filtering the control plane messages based on the network location information; and sending traffic including data from the filtered control plane messages to at least one network tool.

18 Claims, 4 Drawing Sheets

(56) References Cited

U.S. PATENT DOCUMENTS

| | | |
|---|---|---|
| 2011/0075557 A1 | 3/2011 | Chowdhury et al. |
| 2013/0097329 A1 | 4/2013 | Alex et al. |
| 2017/0230832 A1 | 8/2017 | Ophir et al. |
| 2018/0167906 A1* | 6/2018 | Chellamani ............. H04W 4/12 |
| 2018/0367569 A1* | 12/2018 | Verma ................. H04L 63/1408 |
| 2019/0098522 A1 | 3/2019 | Tenea et al. |
| 2019/0166020 A1 | 5/2019 | Mommileti |
| 2019/0199613 A1 | 6/2019 | Jambur Sathyanarayana et al. |

OTHER PUBLICATIONS

"IXIA GTP Session Controller 7433," Ixia Data Sheet, 915-6606-01-2161 Rev D, www.ixiacom.com, pp. 1-6 (Aug. 2017).

"3rd Generation Partnership Project; Technical Specification Group Services and System Aspects; System Architecture for the 5G System; Stage 2 (Release 15)," 3GPP TS 23.501 V1.0.0, pp. 1-146 (Jun. 2017).

"SAE Gateway Overview," SAE-GW Administration Guide, StarOA Release 20, pp. 1-148 (Mar. 2017).

"Application Note: Subscriber-Aware Visibility—Rethinking Operator Infrastructure Monitoring," Gigamon 4092-01, pp. 1-21 (Nov. 2016).

Bhardwaj, "Technology Primer on "Understanding the Different Aspects of LTE and Its Impact in Various Areas"," Accessed from wayback machine https://web.archive.org/web/20160620183436/https://www.syniverse.com/assets/files/custom_content/understanding-different-aspects-lte.pdf, pp. 1-32 (Jun. 20, 2016).

Suthar, "Designing LTE with IPv6," Cisco Systems Inc, pp. 1-34 (2010).

* cited by examiner

US 11,039,338 B2

METHODS, SYSTEMS, AND COMPUTER READABLE MEDIA FOR CONTROL PLANE TRAFFIC FILTERING IN A CONTROL AND USER PLANE SEPARATION (CUPS) ENVIRONMENT

TECHNICAL FIELD

The subject matter described herein relates to communications networks. More specifically, the subject matter relates to methods, systems, and computer readable media for control plane traffic filtering in a control and user plane separation (CUPS) environment.

BACKGROUND

Control and User Plane Separation (CUPS) is a useful design feature for some communications networks. For example, 5G networks are CUPS based because CUPS allows operators to separate the evolved packet core (EPC) into a control plane that can sit in a centralized location, e.g., the middle of a country or region, and for the user plane to be placed closer to the applications or user devices supported, e.g., an edge or coast of the country or region. CUPS architecture has many advantages, including the ability to scale control and user plane capacities differently depending on need. Additionally, with the drive towards 5G use cases that require low latency, many operators are going to utilize CUPS to place a larger portion of subscriber's user data at the edge of the network, closer to the user.

Traffic monitoring tools (e.g., network probes) may need relevant control and user plane traffic to perform various analyses and reports. However, in a distributed environment where control plane is centralized and broadcast out to each edge location, monitoring is not scalable because monitoring tools, also referred to as network tools, located at edge locations are quickly overwhelmed with control plane data that is irrelevant (e.g., unrelated) to the subscribers handled at that location.

Accordingly, in light of these difficulties, a need exists for methods, systems, and computer readable media for control plane traffic filtering in a CUPS environment.

SUMMARY

Methods, systems, and computer readable media for control plane traffic filtering in a control and user plane separation (CUPS) environment are disclosed. According to one method for control plane traffic filtering in a CUPS environment, the method occurs at a network node implemented using at least one processor and at least one memory. The method includes receiving, from one or more sources, network location information associated with a first network location; receiving control plane messages for different network locations; filtering the control plane messages based on the network location information; and sending traffic including data from filtered control plane messages to at least one network tool.

A system for control plane traffic filtering in a CUPS environment includes a network node is implemented using at least one processor and at least one memory. The network node is configured for: receiving, from one or more sources, network location information associated with a first network location; receiving control plane messages for different network locations; filtering the control plane messages based on the network location information; and sending traffic including data from filtered control plane messages to at least one network tool.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
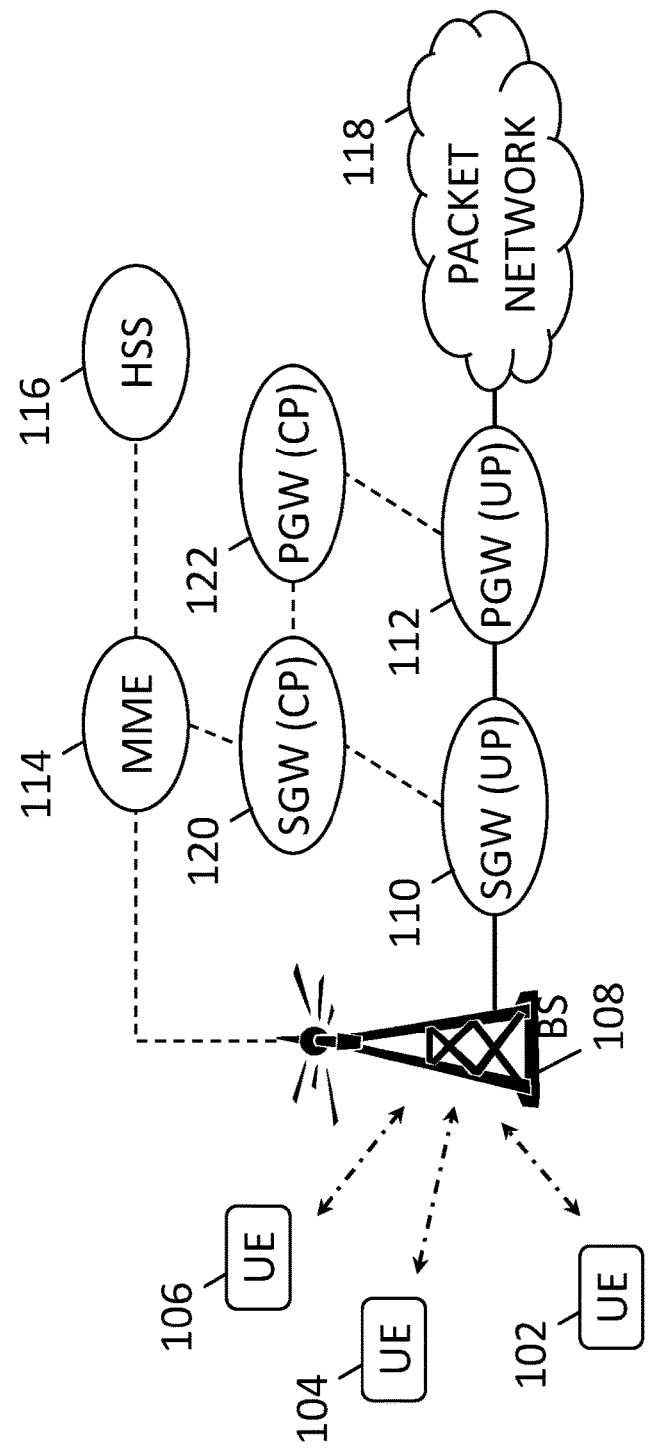
FIG. 1 is a diagram illustrating an example control and user plane separation (CUPS) environment.

The subject matter described herein relates to methods, systems, and computer readable media for control plane traffic filtering in a control and user plane separation (CUPS) environment. When monitoring network traffic in networks that are CUPS based (e.g., 5G networks), it may be desirable to have monitoring tools in multiple locations (e.g., edge locations, access networks, sites, etc.) for monitoring user plane traffic. However, a conventional traffic monitoring system may be unable to handle large loads of user plane traffic and control plane traffic received in a monitored location, e.g., because the traffic monitoring system receives extraneous control plane traffic for controlling multiple other locations that are unrelated to the current monitored location.

In accordance with some aspects of the subject matter described herein, techniques, methods, and systems for control plane traffic filtering in a CUPS environment are disclosed. For example, in a CUPS environment (e.g., a 5G network), a general packet radio service (GPRS) tunneling protocol (GTP) session controller (GSC) (e.g., a session aware load balancer capable of filtering and load balancing incoming user and control plane traffic or copies thereof to multiple network tools) may reside in a network or subnetwork (e.g., a site) that handles a particular geographic area (e.g., Raleigh, N.C.). In this example, the GSC may receive copies of user plane traffic associated with one or more interfaces (e.g., a S1-U interface, etc.) and may receive copies of control plane traffic associated with one or more (e.g., a S1-MME interface, a S11 interface, Sxa interface, etc.). Continuing with this example, the GSC may be configured to filter received control plane traffic such that only relevant control plane traffic is sent to a network tool for processing (e.g., other control plane traffic may be discarded, logged, or sent elsewhere).

In accordance with some aspects of the subject matter described herein, techniques, methods, and systems for filtering control plane traffic may include using network location information (e.g., cell identifiers) to identify relevant control plane traffic. For example, a network operator may configure a GSC with predefined network location information (e.g., a group of local cell identifiers) at deployment and/or may utilize a technique to obtain or modify network location information during usage. In some embodiments, obtaining or modifying network location information may include analyzing one or more messages (e.g., attach requests, location update requests, or other messages containing location information) sent from a base station and storing cell identifiers and/or network location information from the messages. By detecting network location information from various messages, irrelevant control plane traffic (e.g., control plane traffic from another network location) can be filtered and not sent to a network tool for processing (e.g., network analysis or session record generation).

In some embodiments, network location information may include a network identifier, a mobile country code (MCC), a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), or an eUTRAN CGI (EGCI).

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating an example CUPS environment 100. In some embodiments, CUPS environment 100 may include one or more nodes of a system architecture evolution (SAE) core or evolved packet core (EPC) network nodes, 3rd Generation Partnership Project (3GPP) defined network nodes, LTE network nodes, 5G network nodes, and/or other nodes. Referring to FIG. 1, CUPS environment 100 may include user equipment (UEs) 102-106, one or more base stations (BS) 108, a serving gateway (SGW) for user plane (UP) traffic (SGW-UP) 110, a serving gateway (SGW) for control plane (CP) traffic (SGW-CP) 120, a packet gateway (PGW) for UP traffic (PGW-UP) 112, a packet gateway (PGW) for CP traffic (PGW-CP) 122, a mobility management entity (MME) 114, a home subscriber server (HSS) 116, and a packet network 118 (e.g., the Internet). UEs 102-106 may represent any suitable device usable by a user (e.g., a mobile subscriber) to communicate via or using CUPS environment 100. For example, UE 102 may be a mobile phone, a laptop, a tablet device, a computing platform, or other device for communicating via CUPS environment 100.

BS 108 may represent any suitable entity (e.g., a base transceiver station (BTS), node B, an evolved node B (eNodeB), a 5G node B (gNodeB), etc.) for providing data via an air interface. For example, BS 108 may include one or more eNodeBs having functionality similar to that of a radio network controller (RNC) and a base station (BS) in 2G networks or an RNC and a Node B in 3G mobile networks. In another example, BS 108 may include one or more gNodeBs that interact with an EPC via one or more eNodeBs.

In some embodiments, BS 108 may communicate directly with user devices and may be responsible for header compression, ciphering, reliable delivery of packets, admission control, and radio resource management. BS 108 may also communicate with various other modules and/or nodes, e.g., SGW-UP 110 or a MME 114 for performing various control plane signaling functions such as network attaching, UE authentication, bearer channel setup, and mobility management. In some embodiments, BS 108 may be directly connected via X2 interfaces.

SGW-UP 110 may represent any suitable entity (e.g., a node containing a processor and a memory) for routing and forwarding user plane data traffic (e.g., GTP-U data packets). For example, SGW-UP 110 may include functions similar to and/or different from user plane functions performed by a gateway GPRS support node (GGSN) or a serving GPRS support node (SGSN) in a 3G network. SGW-UP 110 may represent one or more nodes facilitating a data path between BS 108 and PGW-UP 112. For example, SGW-UP 110 and BS 104 may communicate via an S1-U, S4-U, S12 or another interface; SGW-UP 110 and PGW-UP 112 may communicate via an S5-U or S8-U interface; and SGW-UP 110 and SGW-CP 120 may communicate via an Sxa interface.

In some embodiments, SGW-UP 110 may part of an EPC or an SAE network and packets from or to packet network 118 may traverse SGW-UP 110 using an evolved GTP (eGTP) or GTP protocol. SGW-UP 110 may perform replication or notification procedures for lawful interception purposes. SGW-UP 110 may also act as a mobility anchor for the user or data plane (e.g., during inter-eNB handovers). SGW-UP 110 may manage and store UE contexts, e.g., information associated with the IP bearer service. For example, for an idle state UE, SGW-UP 110 may terminate a downlink data path and initiate paging when downlink data arrives for the UE. SGW-UP 110 may also be used for communicating with other mobile networks, such as 2G/3G networks. SGW-UP 110 may provide charging services and/or policy enforcement for UE 102, packet network 118, and service classes.

SGW-CP 120 may represent any suitable entity (e.g., a node containing a processor and a memory) for routing and forwarding control plane data traffic (e.g., GTP-C data packets) associated with controlling, managing, or configuring SGW-UP 110. For example, SGW-CP 120 may include functions similar to and/or different from control plane functions performed by a GGSN or SGSN in a 3G network. SGW-CP 120 may represent one or more nodes that communicate with SGW-UP 110 and/or with an EPC or nodes therein. For example, SGW-CP 120 and MME 114 may communicate via an S11 interface or another interface; SGW-CP 120 and PGW-CP 122 may communicate via an S5-C or S8-C interface; and SGW-UP 110 and SGW-CP 120 may communicate via an Sxa interface.

PGW-UP 112 may represent any suitable entity for handling user plane traffic associated with communicating with external packet data networks, such as packet network 118.

For example, PGW-UP 112 may be an access point for traffic to UE 102 from packet network 118. PGW-UP 112 may perform policy enforcement, packet filtering, charging support, lawful interception, and/or other functions. PGW-UP 112 may also act as a mobility anchor between 3GPP and non-3GPP networks, such as CDMA and WiMAX networks. In some embodiments, UE 102 may have simultaneous connectivity with multiple PGWs for accessing multiple packet networks.

PGW-CP 122 may represent any suitable entity for handling control plane traffic associated with communicating with external packet data networks, such as packet network 118. For example, PGW-CP 122 may control, manage, or configure PGW-UP 112 to perform policy enforcement, packet filtering, charging support, lawful interception, and/or other functions.

MME 114 may represent any suitable entity for performing one or more mobility management functions, such as tracking movements associated with UEs 102-106. In some embodiments, MME 114 may communicate information (e.g., mobility-related information) to other nodes in or associated with CUPS environment 100. For example, MME 114 may receive registration requests from BS 108 and may communicate with HSS 116 for performing authentication and/or for updating the current location of the subscriber. MME 114 may also communicate with various other nodes and perform various other functions.

HSS 116 may represent any suitable entity for maintaining and/or providing one or more subscriber data management functions. HSS 116 may maintain subscriber-related information, such as user identification, control information for user authentication and authorization, location information, and user profile data. For example, HSS 116 may include a database containing details about subscribers associated with UEs 102-106, services available to UEs 102-106, and the current locations (e.g., current serving nodes) of UEs 102-106.

Packet network 118 may represent various nodes that communicate with UEs 102-106 via PGW-UP 112. For example, packet network 118 may represent the Internet, or a portion thereof, and may include nodes external to an EPC network (e.g., SGW-UP 110, PGW-UP 112, MME 114, and HSS 116). Packet network 118 may include web servers, media servers, and other nodes for providing services and/or media content.

In some embodiments, UEs 102-106 and packet network 118 may communicate data packets via one or more tunneling protocols. For example, a GTP protocol or an eGTP protocol (e.g., eGTP-U) may provide tunneling support for communicating user data between various elements (e.g., BS 108, SGW-UP 110, and PGW-UP 112). UE context information, such as tunnel GTP related endpoint identifiers (TEIDs), medium access control (MAC) and/or IP addresses, may be stored in the data packets and tunnels may be set up between various nodes. In some embodiments, a GTP protocol or an eGTP protocol may be used for communicating via various interfaces, such as S1-U, S4, S5 and S8 interfaces. GTP tunnels may be used to carry encapsulated transport packet data units (T-PDUs) and signaling messages between tunnel endpoints. The transport bearer may be identified by a source TEID, a destination TEID, a source IP address, and/or destination IP address.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity. In another example, some nodes and/or functions may be separated into multiple entities.

Figure 2:
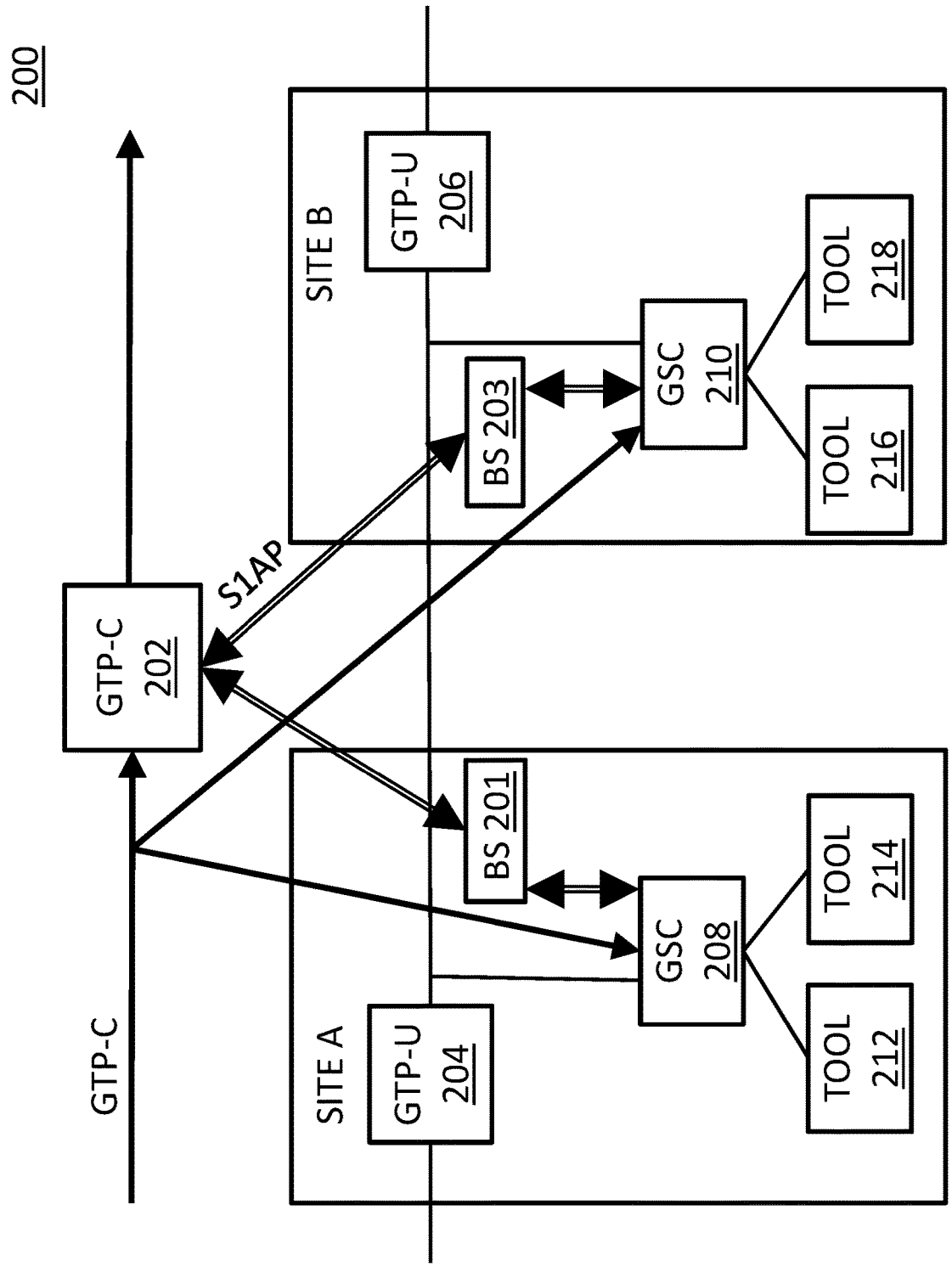
FIG. 2 is a diagram illustrating an example GTP environment for control plane traffic filtering in a CUPS environment.

FIG. 2 is a diagram illustrating an example GTP environment 200 for control plane traffic filtering. Referring to FIG. 2, GTP environment 200 may represent a mobile network or portion thereof that utilizes CUPS and GTP for various traffic. GTP environment 200 may include one or more user plane functions for GTP-U processing and one or more control plane functions for GTP-C processing.

GTP environment 200 may include one or more centralized GTP control plane functions (GTP-C) 202 and one or more network locations or user sites, e.g., site A and site B. Each site may represent a physical (e.g., geographic) or virtual area that supports user plane traffic, e.g., access networks for providing services to some number of users and/or their UEs. For example, site A may include a BS 201, a GTP user plane function (GTP-U) 204, a GSC 208, and network tools 212-214 and may handle 50 thousand subscribers, while site B may include a BS 203, a GTP-U 206, a GSC 210, and network tools 216-218 and may handle 75 thousand different subscribers.

Each of BS 201-203 may include functionality that is the same as or similar to BS 108 described above with regard to FIG. 1. For example, BS 201-203 may each represent any suitable entity (e.g., an eNodeB, a gNodeB, etc.) for providing data via an air interface within its respective site or portion thereof. In some embodiments, each of BS 201-203 may communicate with GTP-C 202 using an S1 application protocol (S1AP) or other protocol(s). In some embodiments, copies of S1AP traffic or portions thereof may be sent to GSCs 208-210.

GTP-C 202 may represent any suitable entity for performing control plane functions. In some embodiments, GTP-C 202 may include a node (e.g., a mobility management node) in the control plane and may provide control plane traffic to various network locations or user sites (e.g., regardless of relevance). For example, GTP environment 200 may represent a 5G network, where the control plane is centralized, and the user plane is distributed. In this example, GTP-C 202 may send all control plane traffic (e.g., GTP-C) to a GSC in every network location or user site.

Each of GTP-Us 204-206 may represent any suitable entity for performing user plane functions. In some embodiments, GTP-Us 204-206 may include a node (e.g., a PGW-UP 112 or SGW-UP 120) in the user plane and may provide user plane traffic, e.g., from or to the Internet. In some embodiments, GTP-Us 204-206 may utilize one or more protocols (e.g., GTP-v1, GTP-v2, and/or packet forwarding control protocol (PFCP)) to send or receive communications with GTP-C 202.

Each of GSCs 208-210 may represent any suitable entity for controlling GTP sessions or related functions. For example, GSCs 208-210 may each be a session aware load balancer capable of filtering and load balancing incoming user and control plane traffic to network tools 212-218, e.g., in a session aware manner. In some embodiments, each of GSC 208-210 may include functionality similar to SGW-CP 120 and may manage, control, or facilitate various functions at one of GTP-Us 204-206. In some embodiments, each of GSCs 208-210 may receive all user plane from the eNodeBs that are located at their respective site. In some embodiments, GSCs 208-210 may receive raw copies of control plane traffic from GTP-C 202. In such embodiments, the control plane traffic may be associated with various sites or locations across the whole network, e.g., regardless of a GSC's respective location or site.

Each of network tools 212-218 may be any suitable entity for performing one or more aspects associated with analyzing traffic, GTP sessions, or other data. Example network tools may include a traffic probe, a traffic analyzer, or a session record creation tool. In some embodiments, network tools 212-218 may collocated with the user plane of their respective site, e.g., network tools 212-214 may be communicatively coupled (e.g., via a port or connection) to GSC 208 and network tools 216-218 may be communicatively coupled (e.g., via a port or connection) to GSC 210.

In some embodiments, e.g., to facilitate traffic monitoring at GSCs 208-210, each of GSCs 208-210 may be configured to receive control plane traffic so that control plane data can be correlated or combined with relevant user plane data before being forwarded onward to one or more of network tools 212-218 for further processing. In some embodiments, since GTP-C traffic may not be segregated by location, all GTP-C traffic may be sent to all GSCs 208-210.

In some embodiments, e.g., to mitigate network tools 216-218 from being overwhelmed with extraneous GTP-C traffic from the whole network, each of GSCs 208-210 may filter GTP-C traffic so that only the relevant GTP-C traffic is sent to one or more of network tools 212-218. For example, GSC 208 may filter control plane traffic (e.g., GTP-C traffic) based on network location information (e.g., eNodeB identifiers or cell identifiers) such that only control plane traffic associated with user plane traffic that is received or that traverses GSC 208 is forwarded to one or more of network tools 212-214. In this example, if control plane traffic does not include network location information that is indicative of a respective site or location, then GSC 208 may determine that the control plane traffic can be dropped or otherwise prevented from being sent to one or more of network tools 212-214.

In some embodiments, each of GSCs 208-210 may be configured for inspecting one or more types of messages for network location information. For example, GSC 208 may receive, via an S1-MME interface or another interface, attach requests, location update requests, or other messages containing location information from one or more eNodeBs in site B. In this example, GSC 208 may identify cell identifiers in monitored messages and may store and use the cell identifiers in filtering control plane traffic based on the cell identifiers.

In some embodiments, in addition to or in lieu of obtaining network location information from various messages, each of GSCs 208-210 may receive (e.g., from a network operator) static or predetermined network location information at time of deployment or other times. For example, a network operator may periodically or aperiodically send a list of cell identifiers for filtering control plane traffic to each of GSCs 208-210. In this example, each of GSCs 208-210 may use this list and/or other network location information (e.g., data gathered by monitoring attach requests) to filter control plane traffic.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity. In another example, some nodes and/or functions may be separated into multiple entities.

Figure 3:
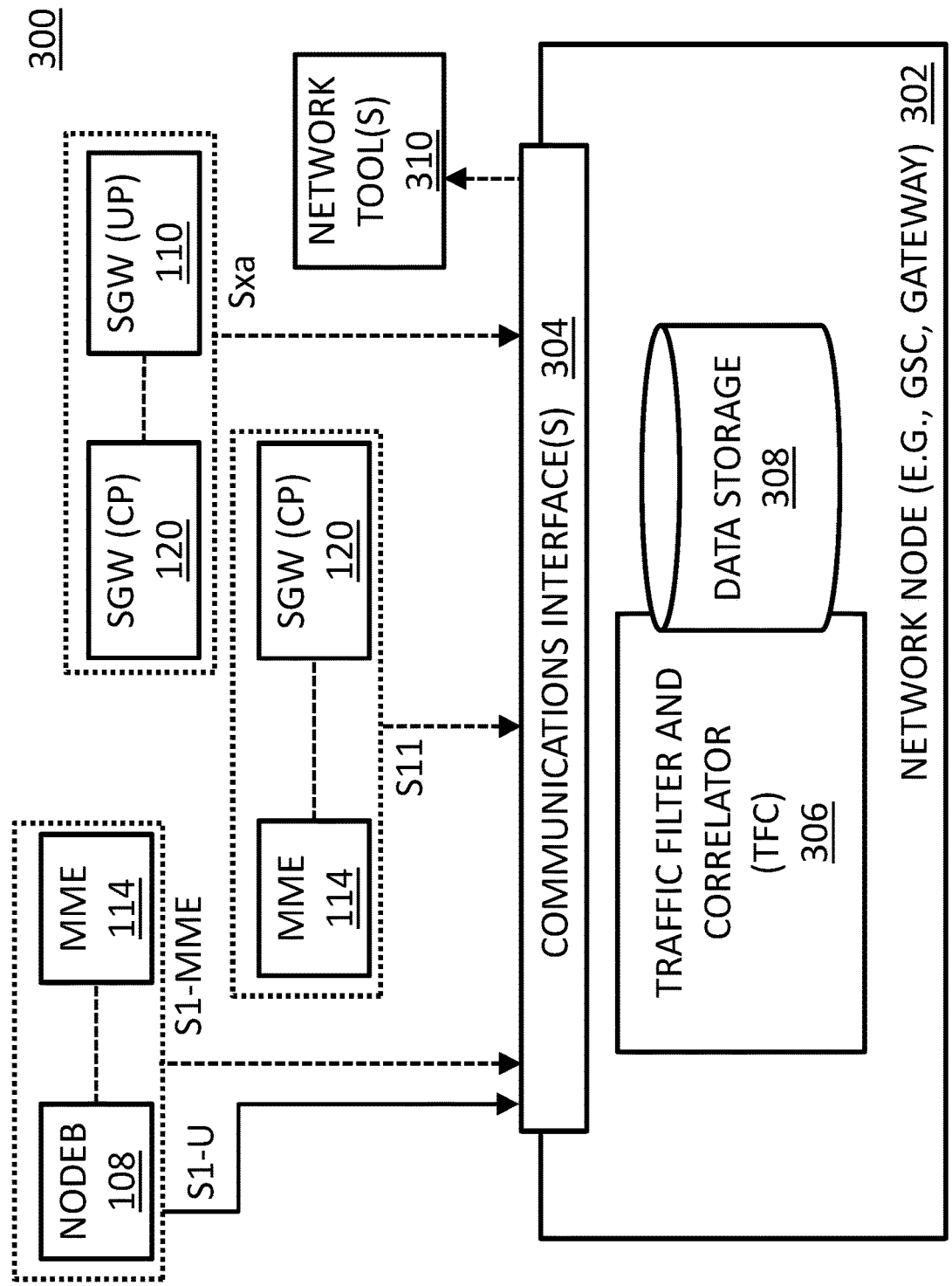
FIG. 3 is a diagram illustrating an example network node for control plane traffic filtering in a CUPS environment.

FIG. 3 is a diagram illustrating an example NN 302 for control plane traffic filtering in a CUPS environment. Referring to FIG. 3, CUPS environment 300 may include a network node (NN) 302 that interacts with nodes from CUPS environment 100, a GTP network 200, an edge network, and/or other nodes. NN 302 may represent any suitable entity or entities (e.g., one or more computing platforms, nodes, or devices) associated with filtering control plane traffic. For example, NN 302 may include or utilize functionality similar to GSC 208.

In some embodiments, NN 302 may be a traffic monitoring device that receives user data plane traffic and control plane traffic or copies thereof, where the traffic is associated with (e.g., originally received via) various interfaces. For example, NN 302 may be a session aware load balancer capable of filtering and load balancing incoming user and control plane traffic or copies thereof to network tool(s) 310, e.g., in a session aware manner.

In some embodiments, NN 302 may include a stand-alone node, a device, a platform, or software executing on one or more processor(s). In some embodiments, NN 302 may be a single device or node or may be distributed across multiple devices or nodes. In some embodiments, NN 302 may include one or more modules for performing various traffic filtering, traffic monitoring, and/or processing related functions.

NN 302 may include or interact with one or more communications interface(s) 304, a traffic filter and correlator (TFC) 306, a data storage 308, and one or more network tool(s) 310. In some embodiments, NN 302 may receive various user plane traffic and control plane traffic from one or more communications interface(s) 304. For example, communications interface(s) 304 may include any suitable entity or entities (e.g., one or more physical or virtual network interface cards) for sending and/or receiving communications. In this example, communications interface(s) 304 may receive and/or send communications associated with LTE interfaces, 3GPP interfaces, Diameter interfaces, GTP interfaces, and/or other interfaces.

In some embodiments, one or more communications interface(s) 304 at NN 302 may support automation, e.g., via a representation state transfer (REST) API, a command line, and/or a web-based GUI. For example, a network operator may use a web browser to interact with a web-based GUI at for programming or configuring one or more aspects for filtering and/or monitoring traffic.

In some embodiments, NN 302 and/or related entities may be configured to receive traffic via an S1-MME interface and GTP-U traffic via a S1-U interface. For example, traffic may include attach requests, location update requests, or other messages that contain network location information usable for identifying or filtering control plane traffic that is relevant to a particular location or site. In another example, the S1-U interface may provide GTP-U traffic usable by network tool(s) 310 for network analytics or other purposes.

In some embodiments, NN 302 and/or related entities may be configured to receive control plane traffic (e.g., GTP-C traffic) associated with various LTE interfaces, e.g., S11, S4-C, S5-C, S8-C, Sxa, and/or other interfaces. For example, NN 302 may receive control plane traffic between MME 114 and SGW-CP 120 via an S11 interface. In another example, NN 302 may receive control plane traffic between SGW-CP 120 and SGW-UP 110 via an Sxa interface.

TFC 306 may be any suitable entity or entities (e.g., software executing on a processor, an ASIC, an FPGA, or a combination of software, an ASIC, and/or an FPGA) for performing one or more aspects associated with filtering control plane traffic and/or correlating or combining user plane data and control plane data into a data stream for processing by network tool(s) 310.

In some embodiments, TFC 306 may filter control plane traffic (e.g., GTP-C traffic) based on network location information (e.g., eNodeB identifiers or cell identifiers) such that TFC 306 forwards only control plane traffic associated with user plane traffic that is received or that traverses NN 302. For example, TFC 306 may use stored network location information to filter control plane traffic that is not associated with a network location indicated by the stored network location information. In this example, the stored network location information may include one or more identifiers that indicates traffic is local or relevant to a particular location. Continuing with this example, if control plane traffic does not include one of these identifiers (e.g., in a packet header), then TFC 306 may determine that the control plane traffic can be dropped or otherwise prevented from being sent to network tool(s) 310.

In some embodiments, NN 302 and/or TFC 306 may be configured for inspecting one or more types of messages for network location information. For example, NN 302 and/or TFC 306 may receive attach requests, location update requests, or other messages containing location information from one or more base stations in a network or area. In this example, NN 302 and/or TFC 306 may identify cell identifiers in the messages and may store and use the cell identifiers in filtering control plane traffic based on the cell identifiers.

In some embodiments, in addition to or in lieu of obtaining network location information from various messages, NN 302 and/or TFC 306 may receive (e.g., from a network operator) static or predetermined network location information at time of deployment or other times. For example, a network operator may periodically or aperiodically send a list of cell identifiers for filtering control plane traffic to NN 302 or TFC 306. In this example, TFC 306 may use this list and/or other network location information (e.g., data gathered by monitoring attach requests) to filter control plane traffic.

In some embodiments, NN 302 and/or TFC 306 may store local network location information for control plane traffic filtering or other purposes. For example, TFC 306 or another entity may monitor one or more network messages (e.g., attach requests from eNodeBs); obtain one or more cell identifiers from the network messages; and store the cell identifiers in an access data store. An access data store may include an access list or other data structure containing network location information for indicating local (e.g., site-related) traffic.

In some embodiments, control plane traffic filtering may involve receiving control plane traffic (e.g., GTP-C traffic); and determining whether the cell identifier in a control plane traffic message matches one of the cell identifiers in an access data store. If the cell identifier in the control plane traffic message matches, a session record or other data record may be created and/or the control plane traffic message or data therein may be sent to network tool(s) 310 for processing. If the cell identifier in the control plane traffic fails to match, subsequent control plane traffic containing that cell identifier may be discarded or ignored (e.g., not sent to network tool(s) 310).

In some embodiments, TFC 306 may combine or correlate related user plane traffic and control plane traffic. For example, TFC 306 may create session data records for traffic that have corresponding identifiers. In this example, the traffic may be correlated on a cell identifier and/or a GTP identifier or tunnel identifier. In another example, TFC 306 may send, to network tool(s) 310, data from related user plane traffic and control plane traffic using a data format or protocol that indicates their relationship (e.g., a session identifier)

In some embodiments, NN 302, TFC 306, and/or another entity may provide traffic or data therein to network tool(s) 310 for inspection, report generation, and/or other purposes. Network tool(s) 310 may be any suitable entity or entities (e.g., software executing on a processor, an ASIC, an FPGA, or a combination of software, an ASIC, and/or an FPGA) for performing one or more aspects associated with analyzing traffic, GTP sessions, or other data. Example network tool(s) 310 may include a traffic probe, a traffic analyzer, or a session record creation tool.

In some embodiments, TFC 306, network tool(s) 310, and/or other entities associated with NN 302 may include functionality for accessing data storage 308 or other memory. Data storage 308 may be any suitable entity or entities (e.g., a storage device, memory, a non-transitory computer readable medium, or a storage system) for maintaining or storing information related to filtering and/or monitoring control plane and/or user plane traffic. For example, data storage 308 may store filtering rules, network location information gathered from monitored base station traffic (e.g., an access data store containing a plurality of cell identifiers), and/or other information. In some embodiments, the number of cell identifiers stored in data storage 308 (e.g., for each user site or location) is limited and static, so maintaining the internal data store is relatively lightweight on resource utilization.

It will be appreciated that FIG. 3 is for illustrative purposes and that various nodes, their locations, and/or their functions described above in relation to FIG. 3 may be changed, altered, added, or removed. For example, some nodes and/or functions may be combined into a single entity. In another example, some nodes and/or functions may be separated into multiple entities, e.g., a filter module and a correlation module instead of TFC 306.

Figure 4:
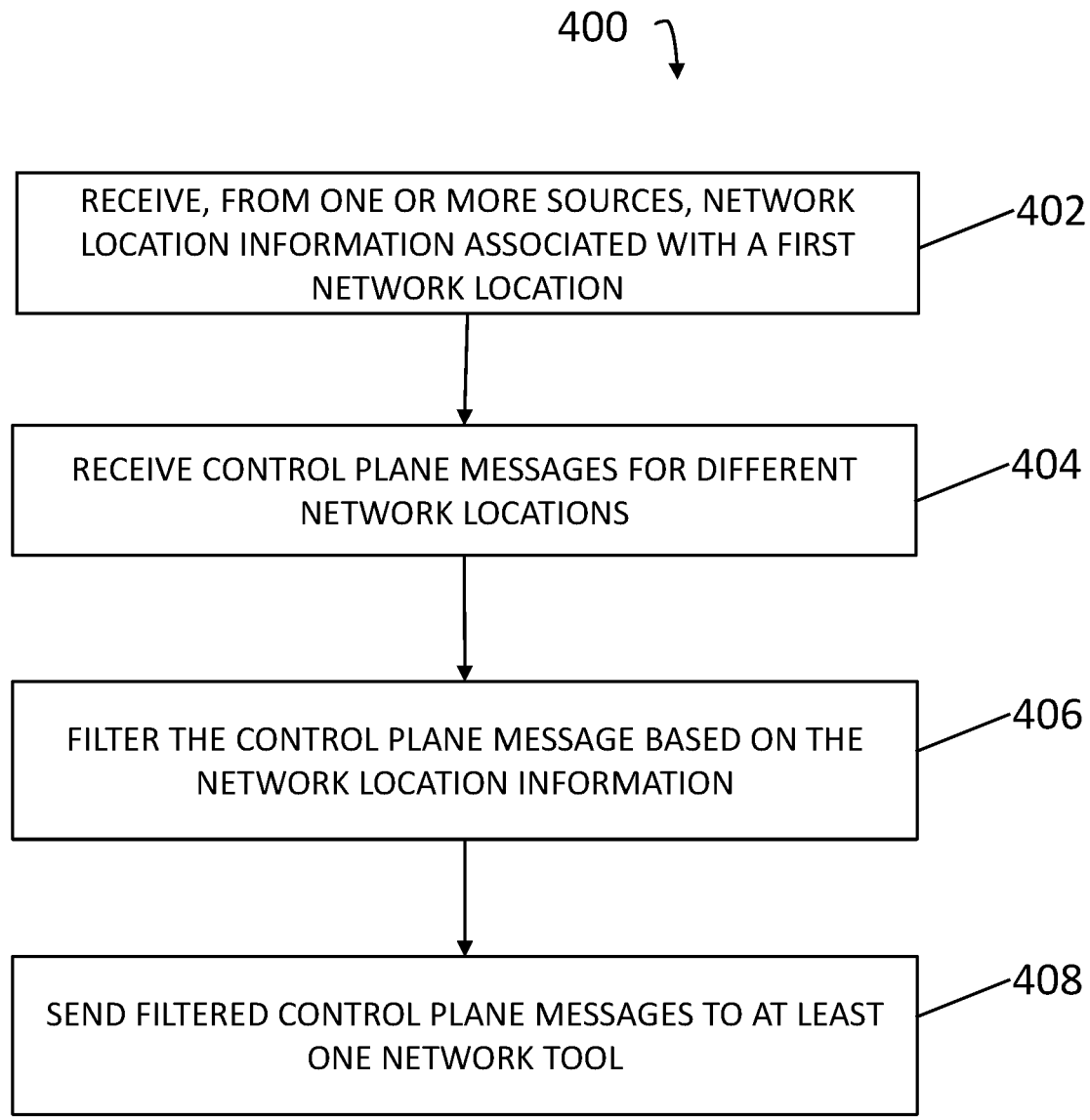
FIG. 4 is a diagram illustrating an example process for control plane traffic filtering in a CUPS environment.

FIG. 4 is a diagram illustrating an example process 400 for control plane traffic filtering in a CUPS environment. In some embodiments, example process 400, or portions thereof, may be performed by or at NN 302, TFC 306, and/or another node or module.

In step 402, receiving, from one or more sources, network location information associated with a first network location. For example, network location information may be received or derived from at least one network message, a data store, or a network operator.

In some embodiments, at least one network message may include an attach request, a location update request, or a message from an eNodeB.

In some embodiments, at least one network message may be associated with an S1-MME interface, a Diameter interface, or an EPC related interface.

In some embodiments, network location information may include a network identifier, an MCC, an MNC, an LAC, a network identifier, a CGI, a BSID, an access node identifier, a CI, a SAC, an RAI, an RAC, a TAI, a TAC, or an EGCI. For example, an attach request or an initial message from an eNode B may include an EGCI or other identifier usable for identifying a network or location associated with subsequent GTP control plane traffic.

In step 404, control plane messages for different network locations may be received.

In step 406, the control plane messages may be filtered based on the network location information.

In some embodiments, filtering control plane messages based on the network location information may include inspecting the control plane messages for network location information and discarding one or more control plane messages that have network location information that does not match the network location information associated with the first network location.

In some embodiments, at least one control plane message may be associated with (e.g., originally received via) an S11 interface, an S4-C interface, an S5-C interface, an S8-C interface, an Sxa interface, a Diameter interface, or an EPC related interface.

In step 408, traffic including data from the filtered control plane messages may be sent to at least one network tool.

In some embodiments, traffic sent to at least one network tool may include data from one or more received user plane messages. For example, a network tool may include a traffic probe, a traffic analyzer, or a session record creation tool.

In some embodiments, at least one user plane message may be received via or associated with an S1-U interface, an S4-U interface, an S5-U interface, an S8-U interface, or an S12 interface. For example, various GTP messages sent via a base station (e.g., gNodeB or eNodeB) to one or more nodes may be sent via S1-U interface and copies of these messages may be sent to or traverse NN 302 (e.g., GSC 208).

In some embodiments, a network node that performs process 400 may include a gateway, a session controller, or a GSC. For example, NN 302 may include GSC 208 or functionality similar to GSC 208.

The subject matter described herein for control plane traffic filtering in a CUPS environment improves the functionality of traffic monitoring systems and/or probe tools by reducing the amount of control plane traffic received and/or handled, thereby increasing resource utilization and scalability for such systems. It should also be noted that a computing platform that implements subject matter described herein may comprise a special purpose computing device (e.g., NN 302 or GSC 208) usable for filtering control plane traffic and/or other functions (e.g., combining user plane traffic and relevant control plane traffic data and forwarding the data to network tool(s) 310.

It will be understood that various details of the subject matter described herein may be changed without departing from the scope of the subject matter described herein. Further, while the subject matter described herein disclose some aspects within the context of 5G and GTP related environments, it will be appreciated that various aspects of the present subject matter described herein could be applied to any communication system that employs CUPS or a similar feature. Furthermore, the foregoing description is for the purpose of illustration only, and not for the purpose of limitation, as the subject matter described herein is defined by the claims as set forth hereinafter.

What is claimed is:

1. A method for control plane traffic filtering in a control and user plane separation (CUPS) environment, the method comprising:

at a network node comprising a general packet radio service (GPRS) tunneling protocol (GTP) session controller of a control and user plane separation (CUPS) environment, wherein the network node is implemented using at least one processor and at least one memory:

receiving, from one or more sources, network location information associated with a first network location;

receiving control plane messages for different network locations;

filtering the control plane messages based on the network location information and an access list of network location information associated with a plurality of base stations supported by the GTP session controller, wherein filtering the control plane messages based on the network location information and the access list includes inspecting the control plane messages for network location information and discarding one or more of the control plane messages that have network location information not in the access list; and sending traffic including data from filtered control plane messages to at least one network tool.

2. The method of claim 1 wherein the one or more sources include at least one network message, a data store, or a network operator.

3. The method of claim 2 wherein the at least one network message includes an attach request, a location update request, or a message from an evolved node B.

4. The method of claim 2 wherein the at least one network message is associated with an S1-MME interface and wherein at least one of the control plane messages is associated with a Diameter interface, or an EPC related interface, an S11 interface, an S4-C interface, an S5-C interface, an S8-C interface, or an Sxa interface.

5. The method of claim 1 wherein the network location information includes a network identifier, a mobile country code (MCC), a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), or an eUTRAN CGI (EGCI).

6. The method of claim 1 wherein the access list includes the network location information associated with the first network location.

7. The method of claim 1 wherein the traffic sent to the at least one network tool includes data from one or more received user plane messages.

8. The method of claim 7 wherein at least one of the user plane messages is associated with an S1-U interface, an S4-U interface, an S5-U interface, an S8-U interface, or an S12 interface.

9. A system for control plane traffic filtering in a control and user plane separation (CUPS) environment, the system comprising:

at least one processor;

at least one memory; and a network node comprising a general packet radio service (GPRS) tunneling protocol (GTP) session controller of a control and user plane separation (CUPS) environment, wherein the network node is implemented using the at least one processor and the at least one memory, wherein the network node is configured for:

receiving, from one or more sources, network location information associated with a first network location;

receiving control plane messages for different network locations;

filtering the control plane messages based on the network location information and an access list of network location information associated with a plurality of base stations supported by the GTP session controller, wherein filtering the control plane messages based on the network location information and the access list includes inspecting the control plane messages for network location information and discarding one or more of the control plane messages that have network location information not in the access list; and sending traffic including data from filtered control plane messages to at least one network tool.

10. The system of claim 9 wherein the one or more sources include at least one network message, a data store, or a network operator.

11. The system of claim 10 wherein the at least one network message includes an attach request, a location update request, or a message from an evolved node B.

12. The system of claim 10 wherein the at least one network message is associated with an S1-MME interface and wherein at least one of the control plane messages is associated with a Diameter interface, or an EPC related interface, an S11 interface, an S4-C interface, an S5-C interface, an S8-C interface, or an Sxa interface.

13. The system of claim 9 wherein the network location information includes a network identifier, a mobile country code (MCC), a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), or an eUTRAN CGI (EGCI).

14. The system of claim 9 wherein the access list includes the network location information associated with the first network location.

15. The system of claim 9 wherein the traffic sent to the at least one network tool includes data from one or more received user plane messages.

16. The system of claim 15 wherein at least one of the user plane messages is associated with an S1-U interface, an S4-U interface, an S5-U interface, an S8-U interface, or an S12 interface.

17. A non-transitory machine readable storage medium having instructions stored thereon which when executed cause a computing device to perform operations comprising:

at a network node comprising a general packet radio service (GPRS) tunneling protocol (GTP) session controller of a control and user plane separation (CUPS) environment, wherein the network node is implemented using at least one processor and at least one memory:

receiving, from one or more sources, network location information associated with a first network location;

receiving control plane messages for different network locations;

filtering the control plane messages based on the network location information and an access list of network location information associated with a plurality of base stations supported by the GTP session controller, wherein filtering the control plane messages based on the network location information and the access list includes inspecting the control plane messages for network location information and discarding one or more of the control plane messages that have network location information not in the access list; and sending traffic including data from filtered control plane messages to at least one network tool.

18. The non-transitory machine readable storage medium of claim 17 wherein the one or more sources include at least one network message, a data store, or a network operator.

* * * * *